United States Patent [19]
Shibata et al.

[11] Patent Number: 5,272,582
[45] Date of Patent: Dec. 21, 1993

[54] MAGNETO-RESISTANCE EFFECT MAGNETIC HEAD WITH STATIC ELECTRICITY PROTECTION

[75] Inventors: Takuji Shibata; Kenichiro Tsunewaki; Mamoru Sasaki; Hideo Suyama; Norio Saito, all of Tokyo, Japan

[73] Assignee: Sony Corporation, Tokyo, Japan

[21] Appl. No.: 766,503

[22] Filed: Sep. 27, 1991

[30] Foreign Application Priority Data
Sep. 28, 1990 [JP] Japan .................. 2-259562
Jan. 25, 1991 [JP] Japan .................. 3-025567

[51] Int. Cl.$^5$ .................................. G11B 5/39
[52] U.S. Cl. ............................ 360/113; 360/126
[58] Field of Search ........................ 360/113, 126

[56]           References Cited
U.S. PATENT DOCUMENTS

| 4,499,515 | 2/1985 | Piotrowski et al. | 360/113 |
| 4,807,073 | 2/1989 | Takeura et al. | 360/113 |
| 4,816,947 | 3/1989 | Vinal et al. | 360/113 |
| 4,860,138 | 8/1989 | Vinal et al. | 360/113 |
| 5,117,319 | 5/1992 | Tokunaga | 360/113 |

FOREIGN PATENT DOCUMENTS

| 0152000 | 8/1985 | European Pat. Off. . |
| 0221540 | 5/1987 | European Pat. Off. . |
| 0325365 | 7/1989 | European Pat. Off. . |

Primary Examiner—John H. Wolff
Attorney, Agent, or Firm—Hill, Steadman & Simpson

[57]                ABSTRACT

A magneto-resistance effect type magnetic head incorporates a grounded conductive layer, a second thin film magnetic core and an MR sensing part, the conductive layer being located near the thin film magnetic core, the layer and the core being electrically connected. The conductive layer is further connected electrically to an electrode of the MR sensing part, the electrode facing an air bearing surface. This setup protects the MR sensing part from static electricity destruction, thus providing a magneto-resistance effect type magnetic head of high reliability.

7 Claims, 5 Drawing Sheets

F I G. 2
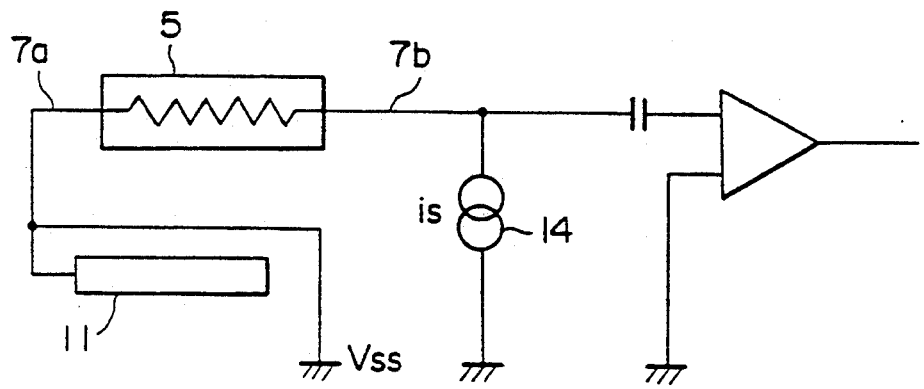
F I G. 3
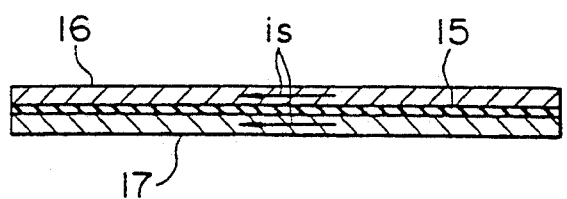

MAGNETO-RESISTANCE EFFECT MAGNETIC HEAD WITH STATIC ELECTRICITY PROTECTION

BACKGROUND OF THE INVENTION

The present invention relates to a magneto-resistance effect type magnetic head.

Today, more and more magneto-resistance effect type magnetic heads (called MR heads hereinafter) that excel in short wavelength sensitivity are being used illustratively as a reproducing magnetic head of the hard disc drive.

Where the magnetic head is a floating type, as shown in FIG. 6, there is provided a slider 52 that floats over a magnetic recording medium 51 (e.g., hard disc) thanks to the air flow created by relative motion of the medium 51 as it rotates. The slider 52 contains a conventional composite magnetic head 53 illustratively comprising an inductive type magnetic head for recording and an MR magnetic head for reproduction in an integral manner. The slider 52 also has a gimbal 53 composed of an elastic member for supporting the slider 52.

FIG. 7 is an enlarged partial cutaway perspective view of the composite thin film magnetic head 53. This magnetic head 53 is mounted on the above-described slider 52 or on a base 55 such as a substrate attached to the slider. The slider 52 or the base 55 comprises a first and a second thin film magnetic core 57 and 58 deposited one upon the other, the cores forming a magnetic gap (g) therebetween at the front ends thereof, the front ends facing the surface opposite to the magnetic recording medium 51, i.e., the air bearing surface (ABS) 56. Within the magnetic gap (g) is one end or one electrode 60a of a magneto-resistance effect sensing part 59 (called the MR sensing part) comprising at least a magneto-resistance effect thin film (called the MR thin film), the one end or electrode 60a facing the ABS 56.

Opposite to the ABS 56 is the other electrode 60b of the MR sensing part 59 substantially in parallel with the electrode 60a. Both electrodes 60a and 60b are made of conductive thin films. Across the approximate center of the MR sensing part 59 is a bias conductor 61 that energizes through an insulation layer 62 the MR sensing part 59 so that the latter is magnetized in a predetermined direction. The energizing is performed so that the MR sensing part 59 operates in a characteristic region representing high sensitivity and the linearity of excellent magneto-resistance effect. A head coil 63 surrounds a magnetic connection that serves as the contact between the thin film magnetic cores 57 and 58. The bias conductor 61 and the head coil 63 are both made of conductive thin films.

The thin film magnetic head 53 of the above-described construction is called the "composite" head because it comprises a shield type MR magnetic head and an inductive type magnetic head; the shield type MR magnetic head has the MR sensing part 59 between the first and second thin film magnetic cores 57 and 58; and the inductive type magnetic head contains the head coil 63 on the magnetic path formed by the first and second thin film magnetic cores 57 and 58.

As depicted in a schematic circuit diagram of FIG. 8, the MR magnetic head has one end of its MR sensing part 59 connected to ground potential Vss. A constant current source 64 supplies a sense current (is) across the electrodes 60a and 60b. In this setup, recordings on the magnetic recording medium 51 cause changes in resistance, the changes being detected as voltage changes.

The surface of the magnetic recording medium 51 develops and accumulates static electricity (i.e., electric charges) due to the air flow mentioned above. If the magnetic head 53 upon starting or stopping, comes sufficiently close to or contacts the surface of the magnetic recording medium 51, a discharge occurs between the ABS 56 of the grounded MR sensing part 59 and the end or the electrode 60a of the MR thin film opposite thereto. A large current triggered by the discharge flows into the MR thin film. That is, the electric charges accumulated on the magnetic recording medium 51 rush into the magnetic head and on to the MR thin film.

The MR thin film is a metal film as small as hundreds of angstroms in thickness to ensure its high sensitivity. The discharge current, if it flows in, destroys the MR thin film (called static electricity destruction).

It is therefore an object of the present invention to provide a magneto-resistance effect type magnetic head sufficiently reliable to avoid static electricity destruction due to the onrush of electric charges from the magnetic recording medium.

SUMMARY OF THE INVENTION

In carrying out the invention and according to a first aspect thereof, there is provided a magnetoresistance effect type magnetic head comprising (with reference to a partial cutaway perspective view of FIG. 1 and a circuit diagram of FIG. 2): a first and a second thin film magnetic core 1 and 2 deposited one upon the other, the front ends of the magnetic cores 1 and 2 forming a magnetic gap (g) therebetween, the magnetic gap facing the surface (ABS 4 of the slider type magnetic head) opposite to a recording medium (not shown); an MR sensing part 5 having at least one end or one electrode 7a thereof located within the magnetic gap (g), the end or the electrode 7a facing the surface opposite to the magnetic recording medium; and a conductive layer 11 provided close to the second thin film magnetic core 2 and connected to ground, the conductive layer 11 facing the surface opposite to the magnetic recording medium.

According to a second aspect of the invention, there is provided a magneto-resistance effect type magnetic head as defined in the first aspect above, wherein the conductive layer 11 is electrically connected to the second thin film magnetic core 2.

According to a third aspect of the invention, there is provided a magneto-resistance effect type magnetic head as defined in the second aspect above, wherein the conductive layer 11 is electrically connected to one electrode 7a of the MR sensing part 5.

According to a fourth aspect of the invention, there is provided a magneto-resistance effect type magnetic head comprising (with reference to cross-sectional views of the head in FIGS. 4 and 5): a first and a second thin film magnetic core 1 and 2 deposited one upon the other, the front ends of the first and second thin film magnetic cores 1 and 2 forming a magnetic gap therebetween, at least either of the first and second thin film magnetic cores 1 and 2 being conductive; and an MR sensing part 5 having one end or one electrode 7a thereof located within the magnetic gap (g), the end or the electrode 7a being retracted from the front tip of the front ends of the first and second thin film magnetic cores 1 and 2; wherein at least either of the first and second thin film magnetic cores 1 and 2 is connected to ground.

Specifically, as depicted in FIG. 4, there is provided a floating type magnetic head having the front ends of the first and the second thin film magnetic cores 1 and 2 located flush with the ABS 4 and having the front tip or one electrode 7a of the MR sensing part 5 retracted from the front ends of the cores 1 and 2. Alternatively, as shown in FIG. 5, there is provided a floating type magnetic head having the front tip or the electrode 7a of the MR sensing part 5 located flush with the ABS 4, while the first and the second thin film magnetic cores 1 and 2 are allowed to protrude beyond the ABS 4.

According to the first aspect of the invention, facing the surface opposite to the magnetic recording medium and near the second thin film magnetic core is a conductive layer which is less resistant than the MR sensing part and which is connected to ground. If an electrically charged magnetic recording medium develops a discharge against the magnetic head, the discharge current flows not to the MR sensing part but to the conductive layer. In this manner, possible static electricity destruction (i.e., burning) of the MR sensing part is avoided.

According to the second aspect of the invention, the conductive layer is electrically connected to the second thin film magnetic core. This arrangement allows the potential between the conductive layer and the second thin film magnetic layer to become substantially the same as the potential across the magnetic gap, whereby electric charges of the magnetic recording medium are prevented from entering the magnetic gap.

According to the third aspect of the invention, the conductive layer is electrically connected to one electrode of the MR sensing part facing the opposing surface of the magnetic recording medium. This arrangement allows the electric charges rushing from the magnetic recording medium to bypass the MR sensing part and to flow into the conductive layer through the electrode of the MR sensing part.

According to the fourth aspect of the invention, the MR sensing part is retracted from the first or second thin film magnetic core 1 or 2 that is connected to ground. In case of the electric discharge mentioned above, this arrangement causes the discharge current to bypass the MR sensing part and to flow into the first or second thin film magnetic core that is grounded. In this manner, possible static electricity destruction (burning) of the MR sensing part is avoided.

BRIEF DESCRIPTION OF THE DRAWINGS

FIG. 2 is a schematic circuit diagram of the embodiment of FIG. 1;

FIG. 3 is an enlarged schematic cross-sectional view of a typical MR sensing part for use with the embodiment;

DESCRIPTION OF THE PREFERRED EMBODIMENTS

Preferred embodiments of the present invention will now be described with reference to the accompanying drawings. Any of the magneto-resistance effect type magnetic heads embodying the invention is a composite thin film magnetic head integrally comprising an MR magnetic head for reproduction and an inductive type magnetic head for recording.

First to be described is a magnetic head practiced as a first embodiment to which the first through third aspects of the invention are applied in particular.

Figure 1:
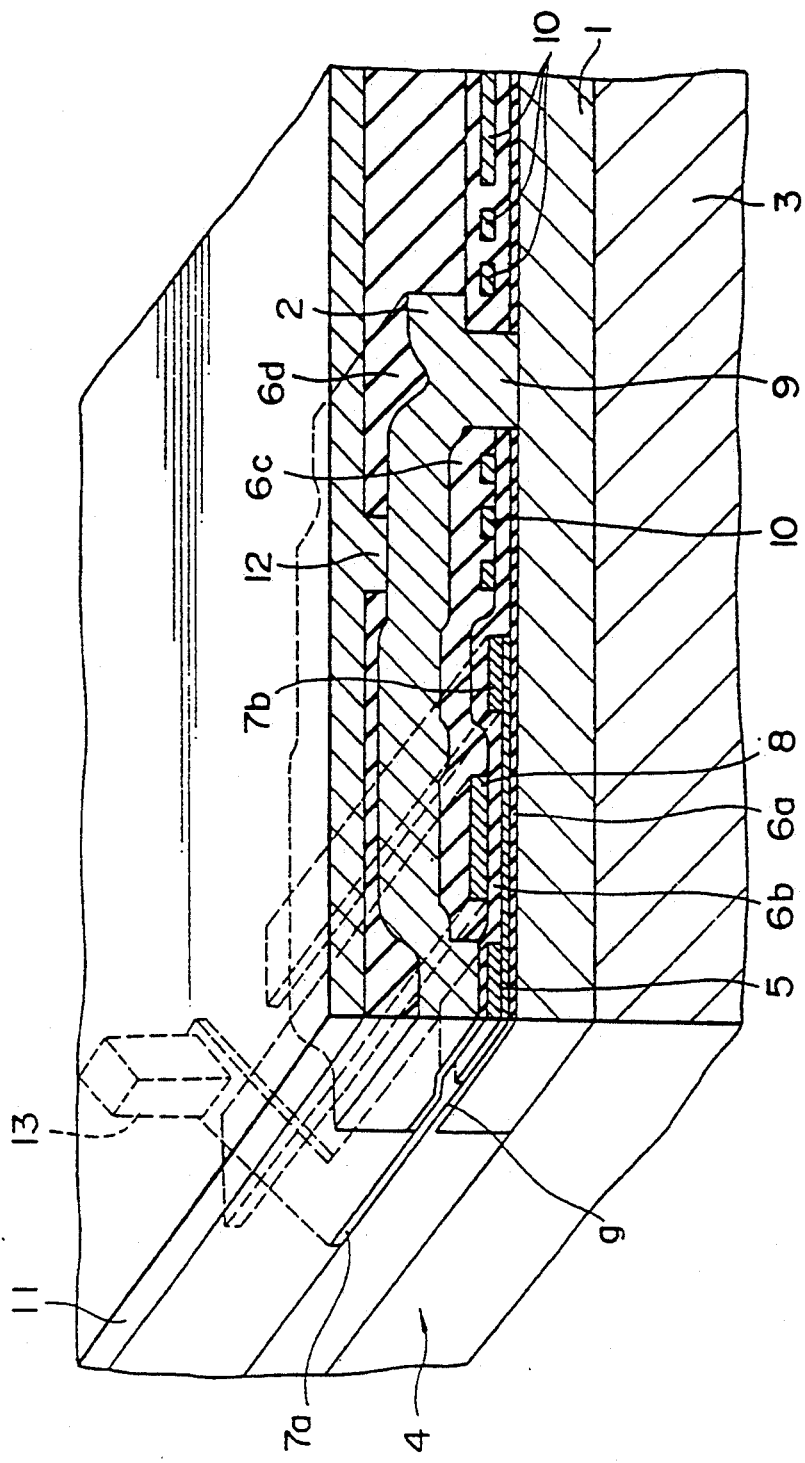
FIG. 1 is an enlarged partial cutaway perspective view of one composite type magnetic head embodying the invention.

With the first embodiment, as shown in FIG. 1, a pair of thin film magnetic cores 1 and 2 are deposited one upon the other with a predetermined clearance in between over E1 base 3 mounted on a slider, the front ends of the cores 1 and 2 forming a magnetic gap (g). Of the thin film magnetic cores 1 and 2, the core 1 is directly mounted on the base 3. The core 1 extends substantially normal to an ABS 4, i.e., the surface opposite to a magnetic recording medium, not shown, in such a way that one end of the core 1 faces the ABS 4. Likewise, the core 2 extends substantially normal to the ABS 4 so that one end of the core 2 faces the ABS 4. The front end of the thin film magnetic core 2 facing the ABS 4 is bent towards the thin film magnetic core 1 so that the magnetic gap (g) is formed between the front ends of both cores, the gap facing the ABS 4. In addition, the thin film magnetic core 2 is in magnetic contact with the core 1 at their back ends, forming a back gap.

Between the first and second thin film magnetic cores 1 and 2 is an MR sensing part 5. The MR sensing part 5 extends substantially normal to the ABS 4 so that one end of the MR sensing part 5 faces the ABS 4. The back end of the MR sensing part 5 reaches an approximate halfway portion of the first and second thin film magnetic cores 1 and 2. The MR sensing part 5 is deposited on the thin film magnetic core 1 with a first insulation layer 6a in between over the base 3. This is to ensure insulation between the MR sensing part 5 and the magnetic core 1.

The MR sensing part 5 comprises a pair of electrodes 7a and 7b through which flows a sense current coming from a constant current source (to be described later), not shown. The electrodes 7a and 7b extend substantially normal to the longitudinal direction of the MR sensing part 5 in such a way that the ends of both electrodes are overlaid on both ends of the MR sensing part 5 in the longitudinal direction of the latter. The electrode 7a, located on the side of the ABS 4, has one crosswise edge thereof facing the ABS 4. The back end of the electrode 7a is bent diagonally backwards relative to the ABS 4.

On the MR sensing part 5 is a bias conductor 8. By energizing the MR sensing part 5 through a second insulation layer 6b, the bias conductor 8 magnetizes the MR sensing part 5 in a predetermined direction. The magnetizing is done so that the MR sensing part 5 operates in a characteristic region representing high sensitivity and the linearity of excellent magneto-resistance effect. The bias conductor 8 is sandwiched between the electrodes 7a and 7b and is substantially in parallel therewith, the tip of the bias conductor 8 being deposited on the MR sensing part 5.

A spiral-shaped head coil 10 surrounds a magnetic connection 9 that serves as the contact between the first and second thin film magnetic cores 1 and 2. The head coil 10 supplies the first and second thin film magnetic cores 1 and 2 with a current corresponding to recorded data. To ensure insulation against the second thin film magnetic core 2, the head coil 10 is embedded in a third insulation layer 6c.

In the first embodiment, the second thin film magnetic core 2 is overlaid with a grounded conductive layer 11. The conductive layer 11 routes to ground the electric charges coming into the magnetic gap from the magnetic recording medium through a fourth insulation layer 6d. Plated with conductive gold (Au) or the like, the conductive layer 11 faces the ABS 4 and is formed all over the base 5. Part of the conductive layer 11 is electrically connected to the second thin film magnetic core 2. This ensures that the potential across the magnetic gap becomes substantially the same as the potential between the conductive layer 11 and the second thin film magnetic core 2. The arrangement prevents electric charges that may come from the magnetic recording medium from rushing into the magnetic gap. A core connecting part 12, electrically connecting the conductive layer 11 to the second thin film magnetic core 2, is located at, but not limited by, the approximate center of the core 2; the core connecting part 12 may be located elsewhere as long as its connection to the second thin film magnetic core 2 is secured.

In the first embodiment, the conductive layer 11 is connected to the electrode 7a of the MR sensing part 5, the electrode 7a facing the ABS 4. This arrangement prevents electric charges that may come from the magnetic recording medium from flowing into the MR sensing part 5. That is, the electrode 7a and the conductive layer 11 are electrically interconnected through a connecting conductive layer 13. The connecting conductive layer 13, plated with conductive gold (Au) or the like, is embedded in a rectangular hole. This hole is formed by removing the insulation layers 6b, 6c and 6d from the back end of the electrode 7a. If electric charges rush into the magnetic gap from the magnetic recording medium, the charges bypass the MR sensing part 5 and flow into the electrode 7a connected to the latter. From the electrode 7a, the charges pass through the connecting conductive layer 13 into the conductive layer 11 that is grounded. As a result, the onrush of electric charges into the MR sensing part 5 is prevented and possible static electricity destruction thereof is avoided.

FIG. 2 is a block diagram of the magneto-resistance effect type magnetic head of the above construction embodying the invention. In FIG. 2, one end of the MR sensing part 5 is connected to around potential Vss. A constant current source 14 supplies a sense current (is) across the electrodes 7a and 7b. In this setup, changes in resistance caused by signal fields of the recordings on the magnetic recording medium are detected as changes in voltage.

In the first embodiment, the MR sensing part 5 may be alternatively constructed as shown in FIG. 3. That is, a pair of MR thin films 16 and 17 are deposited one upon the other and interconnected on a magnetostatic basis through a non-magnetic insulation layer 15 illustratively made of $SiO_2$. This arrangement prevents the generation of magnetic domain walls and minimizes the Barkhausen noise.

The above-described first embodiment is manufactured as follows:

The first thin film magnetic core 1 illustratively made of Fe-Ni is plated onto the base 3 in a predetermined pattern by the known flame plating method, the base 3 being attached to the slider.

Then the non-magnetic first insulation layer 6a illustratively made of $SiO_2$ or $Al_2O_3$ is formed by sputtering or like technique so that the first thin magnetic core 1 is embedded therein.

The surface of the first insulation layer 6a is flattened. On this surface is formed an MR thin film illustratively made of Ni-Fe, Ni-Co or Ni-Fe-Co, the thin film constituting the MR sensing part 5. The MR sensing part 5 extends normal to the ABS 4 so that one end of the MR sensing part 5 faces the ABS 4.

Next, a conductive layer is formed in a predetermined pattern at both ends of the MR sensing part 5 in the longitudinal direction of the latter. The pattern of the conductive layer comprises terminals or wires substantially normal to the MR sensing part 5 and constitutes the electrodes 7a and 7b.

Covering the electrodes 7a and 7b are the first and second insulation layers 6a and 6b, the layer 6a being formed on the first thin film magnetic core 1, the layer 6b being illustratively made of $SiO_2$ or $Al_2O_3$.

The bias conductor 8 is provided across the approximate center of the MR sensing part 5. At the same time, the head coil 10 is formed in spiral shape, the coil 10 being made of a thin film conductive layer and surrounding the magnetic connection 9.

Then the third insulation layer 6c is formed over the bias conductor 8 and the head coil 10.

From the center of the head coil 10, the first, second and third insulation layers 6a, 6b and 6c are removed to create a window area. Through this area, the first and second thin film magnetic cores 1 and 2 are magnetically interconnected.

A magnetic thin film illustratively made of Ni-Fe is deposited by sputtering onto the third insulation layer 6c containing the window area, whereby the second thin film magnetic core 2 is created.

As a result, the first and second thin film magnetic cores 1 and 2 are coupled to each other through the window area.

Alternatively, the first and second thin film cores 1 and 2 may be magnetically interconnected by embedding a magnetic layer of a suitable thickness in the window area.

The fourth insulation layer 6d is formed over the second thin film magnetic core 2. The surface of the layer 6d is flattened.

Formed next is a hole that exposes part of the back end of the already created electrode 7a facing the ABS 4. Specifically, the second, third and fourth insulation layers 6b, 6c and 6d are removed in a rectangular shape from atop the electrode 7a.

The hole thus created is filled with Cu plating, constituting the connecting conductive layer 13 that is electrically connected to the conductive layer 11 to be formed later. With the first embodiment, the connecting conductive layer 13 is 20 to 40 μm in height.

The conductive layer 11 is then formed by gold-plating the fourth insulation layer 6d. When created in this way, the conductive layer 11 is connected to the connecting conductive layer 13 as well as to part of the second thin film magnetic core 2.

Lastly, external lead wires, a flexible PCB and other relevant parts are bonded to the conductive layer 11. The electrode 7a of the MR sensing part 5 is connected to ground potential Vss.

Below is a description of another magneto-resistance effect type magnetic head which is practiced as a second embodiment of the invention and to which the fourth aspect of the invention is applied in particular.

Figure 4:
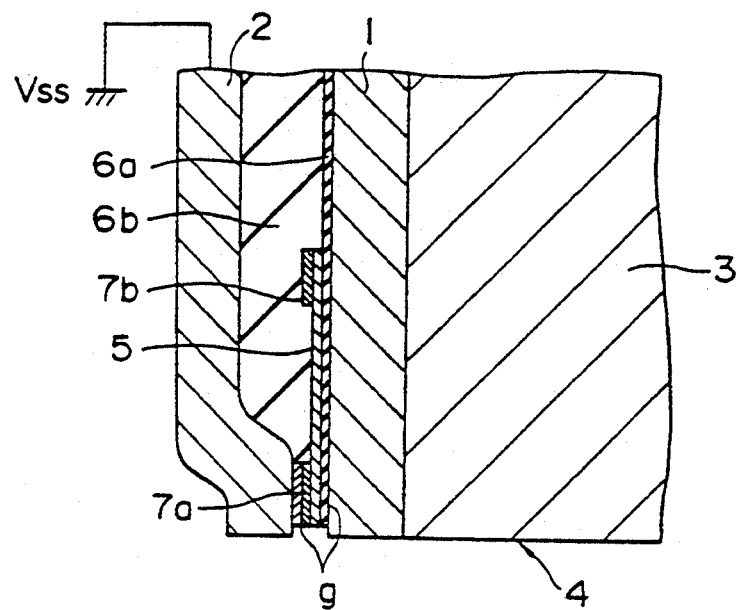
FIG. 4 is a partially enlarged cross-sectional view of another composite type magnetic head embodying the invention.
Figure 5:
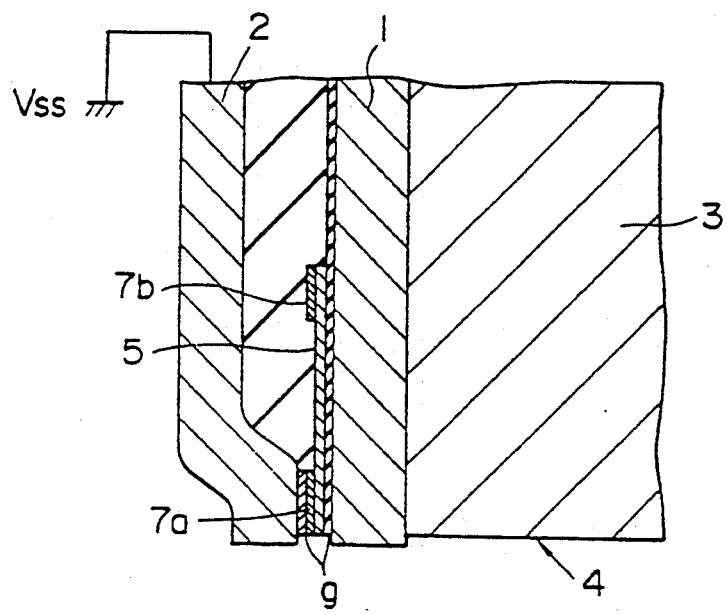
FIG. 5 is a partially enlarged cross-sectional view of yet another composite type magnetic head embodying the invention.
Figure 6:
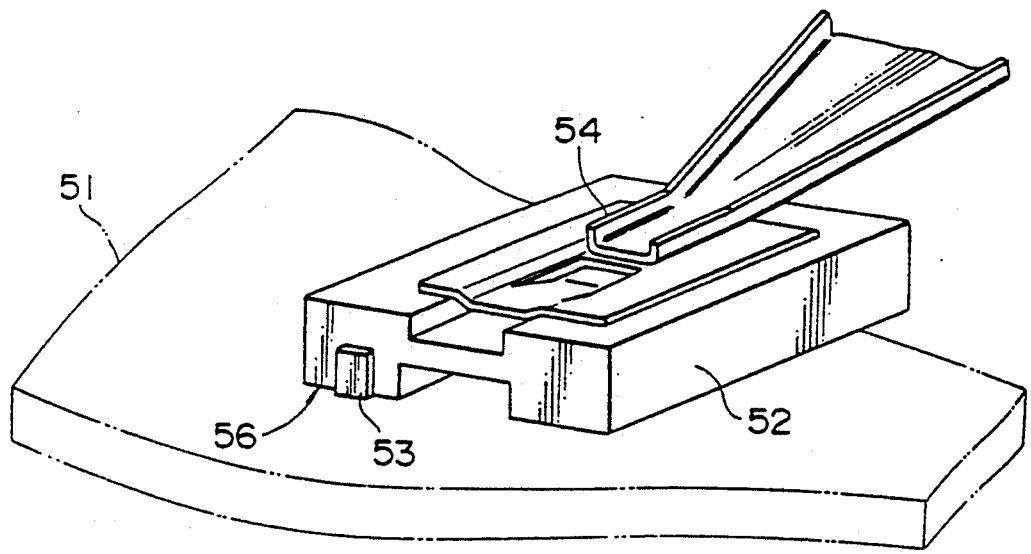
FIG. 6 is a perspective view of a representative magnetic head slider for use with the embodiments.
Figure 8:
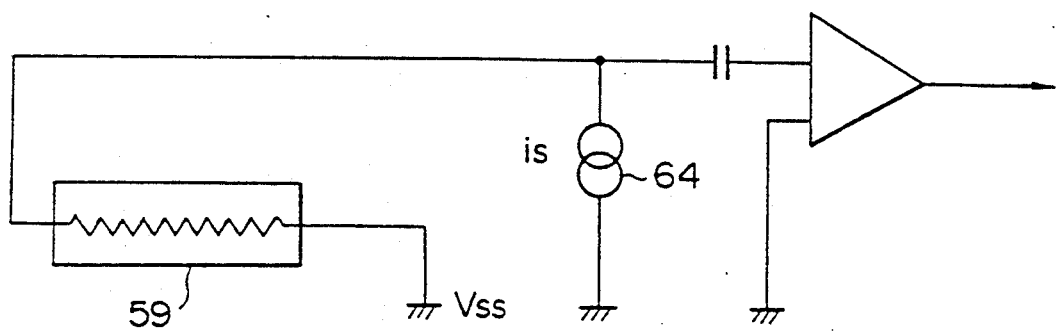
FIG. 8 is a schematic circuit diagram of the conventional magnetic head of FIG. 7.
Figure 7:
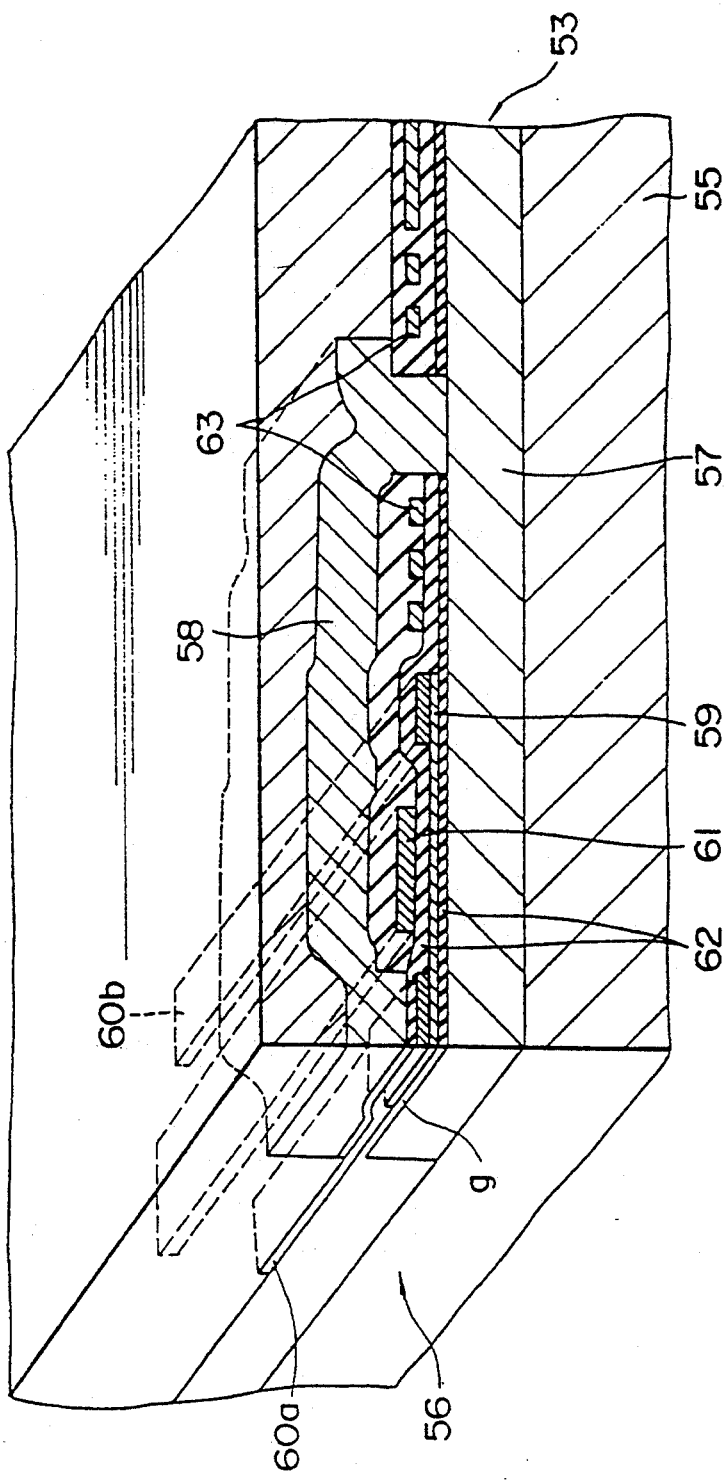
FIG. 7 is an enlarged partial cutaway perspective view of the typical conventional composite type magnetic head.

As depicted in FIGS. 4 and 5, the second embodiment has substantially the same construction as the first embodiment of FIG. 1. What is characteristic of the second embodiment is that at least one of the thin film magnetic cores 1 and 2 deposited on the base 3 is made of the conductive Ni-Fe or the like and the other core is connected to ground Vss. Specifically, the second embodiment has the second thin film magnetic core 2 connected to ground. Furthermore, the front end of the MR sensing part 5 or of the electrode 7a is retracted backwards from those front ends of the first and second thin film magnetic cores 1 and 2 which face the ABS 4. This arrangement causes electric charges from the magnetic recording medium to flow into the grounded second thin film magnetic core 2 and to bypass the MR sensing part 5. In this manner, possible static electricity destruction of the MR sensing part 5 is avoided.

FIG. 4 shows one variation of the second embodiment in which the front ends of the first and second thin film magnetic cores 1 and 2 are made flush with the ABS 4 and in which the front end of the MR sensing part 5 or of the electrode 7a is retracted from the front ends of the first and second thin film magnetic cores 1 and 2. FIG. 5 depicts another variation of the second embodiment in which the front end of the MR sensing part 5 and that of the electrode 7a are made flush with the ABS 4 and in which the front ends of the first and second thin film magnetic cores 1 and 2 are allowed to protrude beyond the ABS 4. In FIGS. 4 and 5 as well as in FIG. 1, like reference characters designate like or corresponding parts, and any repetitive description thereof is omitted.

As described and according to the first aspect of the invention, the conductive layer which faces the surface opposite to the magnetic recording medium and which is connected to ground is located near the MR sensing part. This arrangement prevents a discharge current that may develop between a charged magnetic recording medium and the magnetic head from flowing into the MR sensing part. Instead, the discharge current flows into the grounded conductive layer. In this manner, possible burning of the MR sensing part is avoided.

As described and according to the second aspect of the invention, the conductive layer and the second thin film magnetic core are electrically interconnected. This arrangement makes the potential across the magnetic gap substantially the same as that between the conductive layer and the second thin film magnetic core, thereby suppressing the onrush of electric charges from the magnetic recording medium into the magnetic gap.

As described and according to the third aspect of the invention, the conductive layer and that electrode of the MR sensing part which faces the ABS are electrically interconnected. This arrangement keeps electric charges that may come from the magnetic recording medium from flowing into the MR sensing part. Instead, the charges flow to the grounded conductive layer through that electrode of the MR sensing part.

In this manner and according to the first through third aspects of the invention, possible static electricity destruction (burning) of the MR sensing part is effectively avoided.

Furthermore, according to the fourth aspect of the invention, the front end of the MR sensing part or that of one electrode thereof is retracted from the front ends of the first and second thin film magnetic cores. This arrangement causes any discharge current that may develop to flow into the first or second thin film magnetic core that is connected to ground, thereby effectively protecting the MR sensing part from possible burning.

These and other benefits of the invention provide a magnetic head that ensures significantly high reliability than its conventional counterparts.

It will be apparent that various modifications and/or additions may be made in the apparatus of the invention without departing from the essential feature of novelty involved, which are intended to be defined and secured by the appended claims.

What is claimed is:

1. A magneto-resistance effect type magnetic head for use with a magnetic recording medium, comprising:
   a first and a second thin film spaced apart magnetic cores, the front ends of said first and second thin film magnetic cores forming a magnetic gap therebetween, said magnetic gap facing the surface of said magnetic recording medium;
   a magneto-resistance sensing element having at least one end or one electrode thereof located within said magnetic gap, said end or said electrode facing the opposing surface of said magnetic recording medium to receive flux therefrom; and
   a non-magnetic conductive layer provided close to said second thin film magnetic core and connected to ground, said conductive layer facing the opposing surface of said magnetic recording medium.

2. A magneto-resistance effect type magnetic head according to claim 1, wherein said conductive layer is electrically connected to said second thin film magnetic core.

3. A magneto-resistance effect type magnetic head according to claim 2, wherein said conductive layer is electrically connected to one electrode of said magneto-resistance effect sensing part.

4. A magneto-resistance effect type magnetic head comprising:
   a first and a second thin film spaced apart magnetic cores, the front ends of said first and second thin film magnetic cores forming a magnetic gap therebetween, at least one of said first and second thin film magnetic cores being conductive;
   a magneto-resistance effect sensing element having one end or one electrode thereof located within said magnetic gap, said one end or one electrode of said magneto-resistance effect sensing element being retracted from the front tip of said front ends of said first and second thin film magnetic cores; and
   non-magnetic means connecting said conductive thin film magnetic cores to ground.

5. The magneto-resistance effect type magnetic head according to claim 4, including a coil adapted for writing onto said recording medium, said coil being magnetically coupled to said first and second thin film magnetic cores.

6. The magneto-resistance effect type magnetic head according to claim 5, wherein said coil has a portion thereof located within said gap.

7. The magneto-resistance effect type magnetic head according to either claim 1 or claim 4, wherein said magneto-resistance sensing element comprises a pair of MR thin films deposited one on the other and interconnected magnetostatically through a non-magnetic insulating layer.

* * * * *